United States Patent [19]

Piguet

[11] 4,202,084
[45] May 13, 1980

[54] MACHINING PROCESS FOR THE IN SITU MOUNTING OF DISPLACEABLE GUIDE BLADES IN A SPIRAL TANK OF A HYDRAULIC MACHINE

[75] Inventor: Pierre Piguet, Onex, Switzerland

[73] Assignee: Ateliers des Charmilles S.A., Geneva, Switzerland

[21] Appl. No.: 886,397

[22] Filed: Mar. 14, 1978

[30] Foreign Application Priority Data

Mar. 23, 1977 [CH] Switzerland .......................... 3639/77

[51] Int. Cl.² .......................... B23P 15/00; B23P 13/00
[52] U.S. Cl. .................................. 29/156.8 R; 408/82; 409/175
[58] Field of Search ......... 29/156.8 R, 406, 156.8 CF, 29/DIG. 26; 415/159, 160, 163, 164; 90/12 R; 408/703; 51/290

[56] References Cited

U.S. PATENT DOCUMENTS

| | | | |
|---|---|---|---|
| 1,641,362 | 9/1927 | White | 415/163 |
| 2,363,384 | 11/1944 | Beverlin | 51/290 |
| 2,930,579 | 3/1960 | Boyd et al. | 415/163 |
| 3,188,966 | 6/1965 | Tetlow | 415/DIG. 3 |
| 3,360,241 | 12/1967 | Lindquist | 415/160 |
| 3,389,454 | 6/1968 | Sattler | 29/406 |
| 3,791,761 | 2/1974 | Hayes | 415/163 |

*Primary Examiner*—Daniel C. Crane
*Attorney, Agent, or Firm*—Emory L. Groff, Jr.

[57] ABSTRACT

The present invention relates to a machining process especially suitable for facilitating the construction of large turbines wherein displaceable guide blades for directing fluid to the rotor have to be provided on the downstream side of the volute or spiral tank of the turbine. Hitherto the whole unit had to be machined and assembled in the workshop and then transported to site. The present invention provides for an on site in situ machining process for mounting displaceable guide blades and comprises securing pairs of bases to an annulus of crosspieces located in the tank with each base having machined surfaces defining a hole therein and with said pairs of bases being positioned with the holes thereof being parallel to each other and in coaxial alignment, and then using said bases as a positioning template for a machining device for machining a plurality of portions each having roughly cut-out holes provided in extension means of a ring member forming part of said annulus of crosspieces which extends in a direction towards the space in which the rotor of said machine turns.

1 Claim, 5 Drawing Figures ulic machine characterised in that pairs of bases are secured to a ring of crosspieces of the tank and each base has a machined hole therein the holes being parallel one to the other and in coaxial alignment, and that these bases are used as a positioning template for a device for the machining of a plurality of soles or flange portions each having a roughly cut-out hole, said plate portion extending from one of the the ring members forming the ring of crosspieces in a direction towards the space in which the rotor of the machine turns.

MACHINING PROCESS FOR THE IN SITU MOUNTING OF DISPLACEABLE GUIDE BLADES IN A SPIRAL TANK OF A HYDRAULIC MACHINE

The present invention relates to an in situ machining process for the mounting of movable blades of a volute or spiral tank of a hydraulic installation.

Hydraulic machines which might be taken into consideration are, for example, turbines having a volute or spiral tank communicating with the space in which the turbine rotor turns by means of a distributor comprising a ring of struts or crosspieces and of movable blades forming guide vane means.

For turbines of small and medium dimensions, the ring of crosspieces is stationarily mounted in the tank by means of screws and has been machined prior to mounting with an upper base and a lower base with the simultaneous location of the movable blades.

With hydraulic machines of large dimensions, the assembly of the ferrules of the tank is effected in situ and the tank thus assembled and welded to the ring of crosspieces, itself brought to the site in several parts which have been previously machined in the workshop for the mounting by screws and bolts with an upper base and a lower base.

The process in accordance with the invention has the object of avoiding costly machining in the workshop of the ring of crosspieces and of the upper base and of facilitating the in situ mounting of the movable blades of hydraulic machines of large dimensions.

According to the present invention there is provided an in situ machining process for the mounting of displaceable blades in a spiral tank of a hydraulic machine characterised in that pairs of bases are secured to a ring of crosspieces of the tank and each base has a machined hole therein the holes being parallel one to the other and in coaxial alignment, and that these bases are used as a positioning template for a device for the machining of a plurality of soles or flange portions each having a roughly cut-out hole, said plate portion extending from one of the the ring members forming the ring of crosspieces in a direction towards the space in which the rotor of the machine turns.

This process is characterised in that there is fixed to the crown of struts of the tank, two bases presenting machined holes, parallel one to the other and in coaxial alignment, and that the said bases are used as a positioning template for the device for machining of a sole, presenting roughly cut-out holes, extending one of the rings of the crown of struts in a direction of the space in which the wheel of the machine turns.

The invention will be described further, by way of example, with reference to the accompanying drawings, in which.

Figure 1:
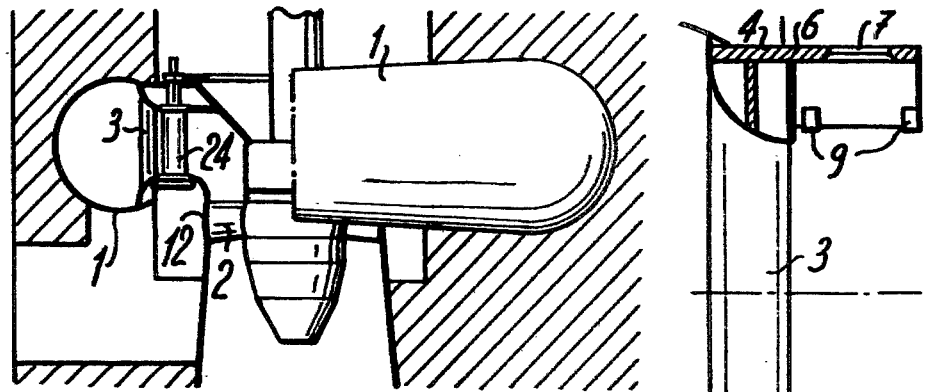
FIG. 1 is a view in elevation and partially in section, of a turbine assembly having a distributor or guide vane means which include movable blades.

A turbine is illustrated in FIG. 1 and comprises a volute or spiral tank 1 communicating via a distributor comprising a crown or ring of stationary blades or crosspieces 3 and of movable blades 24 with a space in which the wheel or rotor 2 of the turbine is rotatable.

Figure 2:
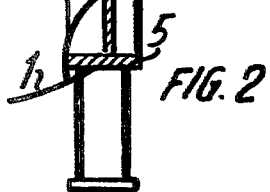
FIG. 2 is an enlarged fragmentary section through a portion of the tank and ring of crosspieces prior to the mounting of a movable blade.
Figures 3, 4, 5:
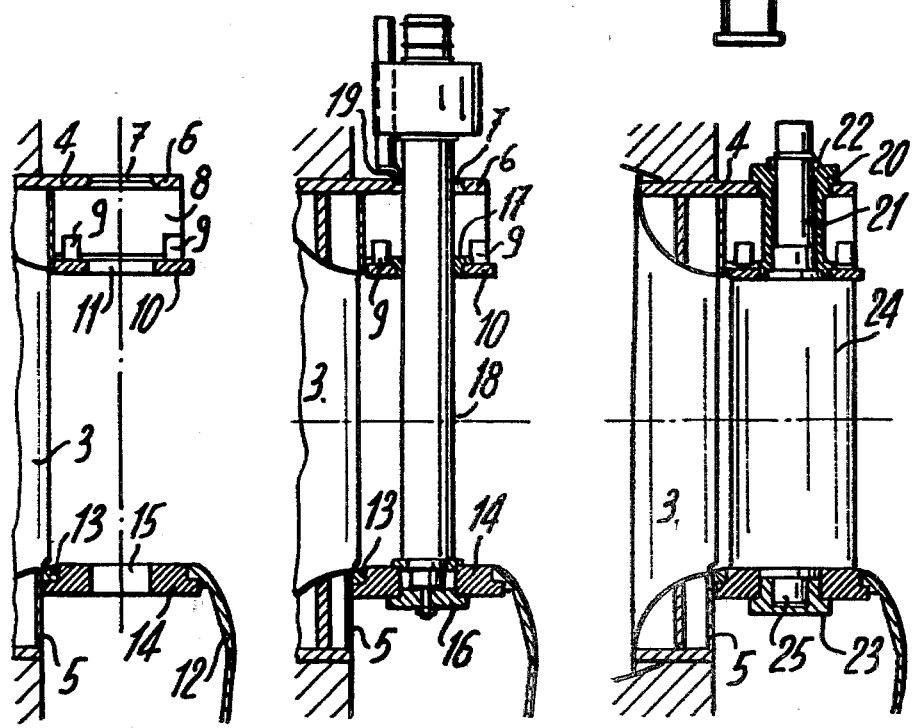
FIGS. 3 to 5 are similar views to FIG. 2 but each illustrating a sequence in the machining process.

During the on site installation of a turbine of large dimensions such as, for example, in an electricity generating station, the bands or ferrules of the tank 1 are assembled and joined together by welding to the ring of crosspieces 3 formed of an upper ring member 4 and a lower ring member 5 (see FIG. 2).

The upper ring member 4 of the crosspieces 3 is extended into the space in which the rotor 2 turns by an upper sole or flange 6 having holes 7 cut out to approximate size and carrying a plurality of radial ribs 8 extending in the direction of the lower ring member 5 of the ring of crosspieces. Radial ribs 8 each have studs 9 on their lower edge and to which studs an upper base 10 is secured by screws. Base 10 has machined holes 11 therein which are coaxially aligned with the roughly cut-out holes 7 of the upper flange 6, during the securing of the upper base 10 to the studs 9.

The lower ring member 5 is subsequently provided with an inwardly directed flange adjacent the upper end of the casing 12 of the rotor 2; said flange being formed by welding a ring 13 onto the inner face of the lower ring member 5 of the ring of crosspieces 3 at a height ensuring the smoothness of a lower base 14 which is adapted to be screwed to the upper end of the casing 12 and also to the ring 13. The lower base 14 has machined holes 15 which are coaxially aligned with the holes 11 of the upper base 10 and the roughly cut-out hole 7 of the upper flange 6 during its screwing to the ring 13 and to the upper end of the casing 12 of the rotor 2.

After screwing and marking of the lower base 14 to the ring 13 and to the upper end of the rotor casing 12, the distance between the lower base 14 and the upper base 10 is adjusted as is the parallelism of the upper base 10 with respect to the lower base 14 by means of correcting washers engagable on the screws securing the upper base 10 to the studs 9.

Centering pieces 16 and 17 are subsequently fixed, each in turn and respectively in the holes 15 of the lower base 14 and in the corresponding holes 11 of the upper base 10. The end of a shaft 18 of a machining device is then engaged in the hole 7 roughly cut in the upper flange 6 and in the centering parts 17 and 16 of the upper base 10 and of the lower base 14. The hole 7 of the upper sole 6 is then machined by means of a boring and milling tool 19 mounted on the shaft 18 so as to adjust the diameter of the hole 7 and their coaxial position to correspond with holes 11 of the upper base 10, on the one hand, and the parallelism of the periphery of the hole 7 on the upper face of the upper sole 6 with respect to the upper base 10 on the other hand. The shaft 18 of the machining device is subsequently removed from the last hole 7 thus machined and the corresponding centering parts 17 and 16 are also removed from the holes 11 and 15 in the upper base 10 and lower base 14. A box 20 forming a bearing for the upper end 21 of the shaft of a movable blade 24 is disposed in each pair of superposed machined holes 7 and 11 of the upper flange 6 and upper base 10. The lower base 14 is detached from the ring 13 and from the upper end of the casing 12. The upper end 21 of the shaft of a movable blade 24 is then introduced into each of the boxes 20 by the open end of such located on the side of the upper base 10. The blades 24 are each secured and suspended at the open end of the box 20 on the side of the upper flange 6, by means of a circlip 22 mounted in a peripheral groove in the upper end 21 of the shaft of each of said movable blades 24 and passing above the upper end of the box 20.

The lower base 14 is subsequently re-screwed to the ring 13 and to the upper edge of the casing 12, each of its machined holes 15 being provided with a box 23 serving as a bearing for the lower end 25 of the shaft of a movable blade 24, and the mounting of the movable blades of the hydraulic machine is thereby achieved. The circlip 22 can then be removed from the upper end 21 of the shaft of the movable blade 24.

Numerous variations for putting into practice of the described process can be envisaged.

Thus, for example, in hydraulic machines which do not have a rotor casing, the machined lower base 14 can be secured only to the ring 13 which is welded to the inner face of the lower ring 5 of the crown of struts.

Instead of being an extension of the upper ring member 4 of the ring of crosspieces 3, the sole or flange 6 having the initially roughly and smaller cut-out hole 7 can be an extension of the lower ring member 5. In this case, the upper ring member 4 would be provided with a ring 13 on its inner face and ring to which the upper base 10 would be screwed. The lower base would be screwed to the studs 9 of the radial ribs 8, orientated, in this case, in the direction of the upper ring member 4, with the interposition of correcting washers adapted to adjust its parallelism with respect to the upper base 10 and also its distance from this latter.

In this case as in the other, a ring or circle of vanes controlling the opening and the closing of the blades 24 of the distributor of the turbine can be mounted on any one of the ends of the shaft 21, projecting from the boxes 20, 23 which serve as bearings.

In the case where the flange 6 does not present radial ribs 8 on its face opposite the machined base 14 and 10 respectively, the studs 10 could be directly fixed to this face of the flange 6.

I claim:

1. A machining process for the in situ mounting of displaceable guide blades in a spiral tank of a hydraulic machine with each said blade including a medial blade having upper and lower mounting ends, comprising the steps of securing spaced-apart upper and lower bases to upper and lower rings of a related annulus of crosspieces located in the tank, said upper ring including an extension disposed above and spaced from said upper base and extending toward the space in which the rotor of said machine turns, said extension having a roughly cut hole therein, each of said two bases having a previously machined surface defining a hole therein, positioning said bases parallel to each other with the holes thereof in coaxial alignment with each other as well as with said roughly cut hole by manipulating said lower base relative said upper base, applying a separate centering piece within each of said holes of said spaced-apart upper and lower bases, placing the shaft of a machining device through said aligned roughly cut hole and the holes in said spaced apart upper and lower bases with said shaft engaging said two centering pieces as said centering pieces provide a positioning template for said machining device, machining said roughly cut hole by means of a boring and milling tool attached to said machining device shaft, removing said boring and milling tool and shaft, removing said centering pieces, inserting bearing means within said spaced-apart machined holes in said extension and upper base, removing said lower base from said lower ring to allow inserting of said blade upper mounting means within said bearing means, inserting bearing means within said lower base, and reattaching said lower base to said lower ring with engagement of said lower base bearing means with said blade lower mounting end.

* * * * *